United States Patent
Ward et al.

(10) Patent No.: US 7,657,007 B2
(45) Date of Patent: Feb. 2, 2010

(54) METHOD AND APPARATUS FOR INSTANT VOICE MESSAGING

(75) Inventors: David Ward, Belleville (CA); Mark Bissell, Madoc (CA)

(73) Assignee: Nortel Networks Limited, St. Laurent, Quebec (CA)

(*) Notice: Subject to any disclaimer, the term of this patent is extended or adjusted under 35 U.S.C. 154(b) by 1133 days.

(21) Appl. No.: 10/737,770

(22) Filed: Dec. 18, 2003

(65) Prior Publication Data

US 2005/0136896 A1 Jun. 23, 2005

(51) Int. Cl.
*H04M 1/64* (2006.01)

(52) U.S. Cl. ............. 379/88.17; 379/88.12; 379/88.13; 379/88.18; 379/201.01; 455/412.1; 455/412.2; 455/413; 709/201; 709/202; 709/203; 709/208; 709/209

(58) Field of Classification Search ............. 379/88.12, 379/88.13, 88.17, 88.18, 88.26, 201.01; 455/412.1, 455/412.2, 413; 709/201–203, 208–209
See application file for complete search history.

(56) References Cited

U.S. PATENT DOCUMENTS

| | | | |
|---|---|---|---|
| 5,802,466 A * | 9/1998 | Gallant et al. ............... 455/413 |
| 6,222,909 B1 * | 4/2001 | Qua et al. ................ 379/88.22 |
| 6,661,886 B1 * | 12/2003 | Huart et al. ............ 379/215.01 |
| 7,013,155 B1 * | 3/2006 | Ruf et al. ..................... 455/466 |
| 7,113,767 B2 * | 9/2006 | Vaananen ................ 455/412.1 |
| 7,218,919 B2 * | 5/2007 | Vaananen ................ 455/412.1 |
| 7,245,707 B1 * | 7/2007 | Chan ........................ 379/88.17 |
| 7,305,438 B2 * | 12/2007 | Christensen et al. ........ 709/205 |
| 2002/0073142 A1 * | 6/2002 | Moran ........................ 709/203 |
| 2002/0146097 A1 * | 10/2002 | Vuori ...................... 379/88.22 |
| 2003/0219104 A1 * | 11/2003 | Malik ...................... 379/88.11 |
| 2004/0003046 A1 * | 1/2004 | Grabelsky et al. ........... 709/206 |
| 2004/0076272 A1 * | 4/2004 | Zafar et al. .............. 379/88.13 |
| 2005/0043951 A1 * | 2/2005 | Schurter .................. 704/270.1 |

* cited by examiner

*Primary Examiner*—Hemant Patel
(74) *Attorney, Agent, or Firm*—Ridout & Maybee LLP

(57) ABSTRACT

A system and method for instant voice messaging in a telecommunication system. Users are able to compose, store, retrieve or listen to short messages. The instant voice messaging system provides two operating modes: auto mode and prompt mode. In auto mode, the instant voice message is played on the destination telephone set without user intervention. In prompt mode, the user at the destination telephone set controls playback of the instant voice message. According to another aspect, the instant voice messaging system provides a whisper mode of operation which allows voice messages to be sent and received when the user at the originating set and/or destination set is involved in another call.

1 Claim, 3 Drawing Sheets

METHOD AND APPARATUS FOR INSTANT VOICE MESSAGING

FIELD OF THE INVENTION

The present invention relates to communication systems and more particularly to a method and apparatus for voice messaging.

BACKGROUND OF THE INVENTION

In the art, there are known voice messaging systems. A common characteristic of known systems is the complexity of operation and the number of keystrokes required for even the most basic functions.

In view of these and other perceived shortcomings in the art, there remains a need for an improved voice messaging system.

BRIEF SUMMARY OF THE INVENTION

The present invention provides a method and apparatus for providing voice messaging.

According to one aspect, users are able to compose, store, retrieve, or listen to short voice messages.

According to another aspect, a whisper mode of operation is provided wherein messages are sent and received when the participants are involved in another call.

According to a further aspect, the exchange of short messages between users is facilitated even when engaged in another telephone call.

In one embodiment, the present invention provides a method for transmitting a voice message between a first telephone having a microphone and a second telephone, the method comprises the steps of: pressing a key to initiate recording of a voice message; dialing a number for the second telephone; presenting a notification at the second telephone indicating a pending voice message; playing the voice message at the second telephone in response to a user input.

In another embodiment, the present invention provides a method for transmitting a voice message from an originating telephone to a destination telephone, the method comprises the steps of: pressing a key to initiate recording of a voice message through the microphone; dialing a number for the destination telephone; determining if the destination telephone is on a call, and if on another call, creating a conference call for the other call and for the voice message at the destination telephone; playing the voice message at the destination telephone.

In a further embodiment, the present invention provides a voice message system for sending a voice message between a first telephone and a second telephone in a telecommunication system, the voice message system comprises: a recorder module responsive to a user input from the first telephone for recording a voice message; a dialing module for receiving a number entered by the user for dialing the second telephone; a communication module for establishing a communication path with the second telephone; a locator module for locating the second telephone; a notification module for notifying the second telephone of a pending voice message; and a playback module for playing the voice message at the second telephone.

In yet another embodiment, the present invention provides voice message system for sending a voice message between a first telephone and a second telephone in a telecommunication system, the voice message system comprises: means for recording a voice message in response to a user input; means for dialing a number entered by the user for the second telephone; means for locating the second telephone number and means for determining if the second telephone is enabled for receiving voice messages; means for notifying the second telephone of a pending voice message; means for playing the voice message at the second telephone.

Other aspects and functions of the present invention will become apparent to those ordinarily skilled in the art upon review of the following description of specific embodiments of the invention in conjunction with the accompanying drawings.

BRIEF DESCRIPTION OF THE DRAWINGS

Reference is next made to the accompanying drawings which show, by way of example, embodiments of the invention and in which.

In the drawings, like reference numerals indicate like elements.

DETAILED DESCRIPTION OF THE EMBODIMENTS

Figure 1:
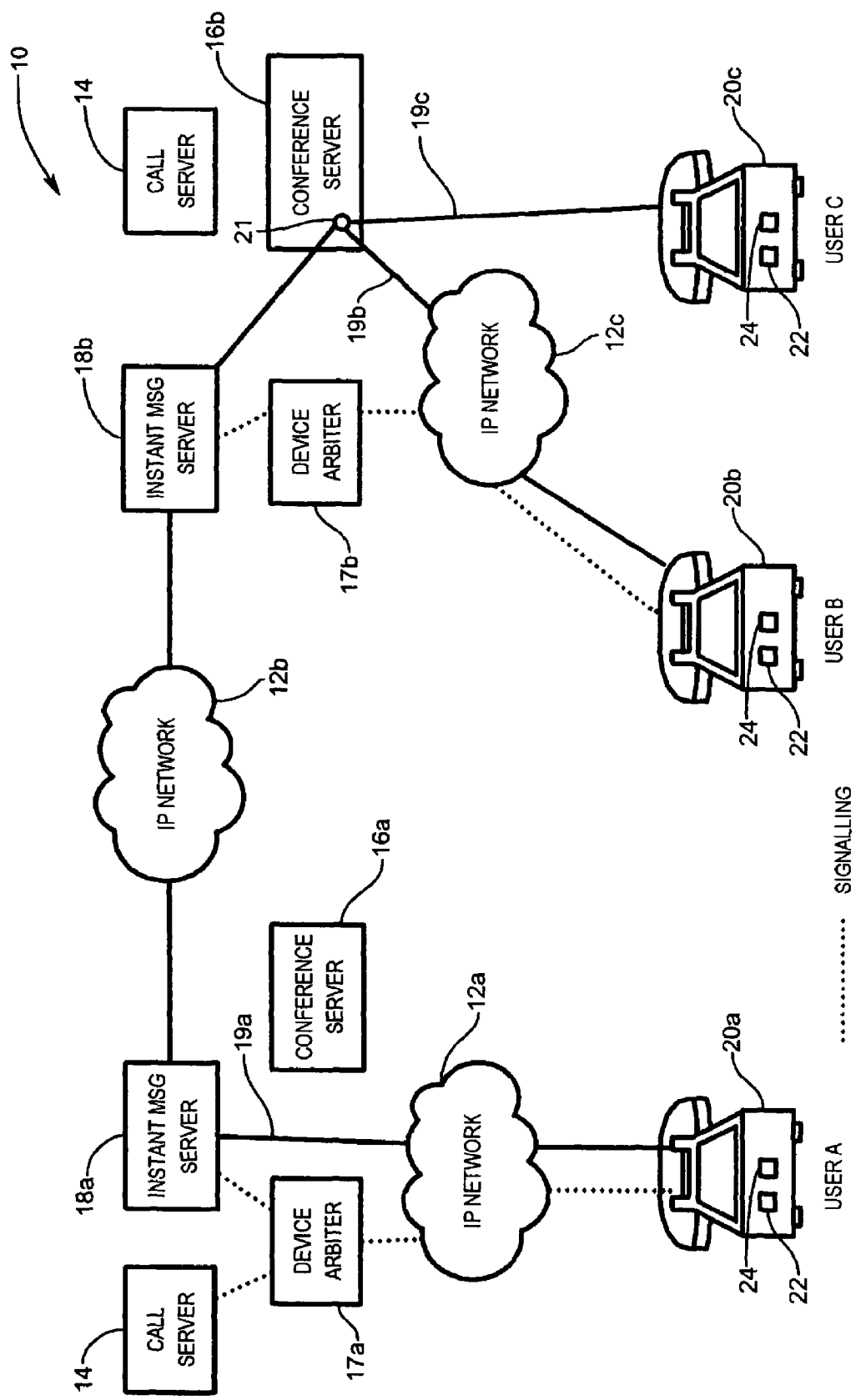
FIG. 1 shows in diagrammatic form an Internet phone system utilizing a voice messaging system in accordance with the present invention.

Reference is first made to FIG. 1 which shows in diagrammatic form an Internet phone system utilizing a voice messaging system according to the present invention. The Internet phone system is indicated generally by reference 10. While the present invention is described in the context of an Internet phone system, it will be appreciated that the invention has wider applicability and is suitable for other types of telecommunication or telephony systems.

As shown in FIG. 1, the Internet phone system 10 comprises a communication network 12, call servers 14 (indicated individually as 14a and 14b), a conference server 16, instant message servers 18 and Internet telephones 20. In FIG. 1, the instant message servers 18, are shown individually as 18a, 18b. The system 10 also includes device arbiters 17, which are shown individually as 17a and 17b. The communication network 12 comprises the Internet which is formed as a network of networks, indicated individually by references 12a, 12b and 12c in FIG. 1. The Internet 12 provides a wide area network for communication according to standardized and/or proprietary Internet protocols as will be within the understanding of those skilled in the art.

The Internet telephones 20 are shown individually as 20a, 20b and 20c, and may comprise the Nortel i2004™ series IP Telephone from Nortel Networks Inc. The Internet telephones 20 include one or more function buttons (not shown) and work together with the call servers 14 to provide telephone features, such as, Call Forward, Call Transfer, and Conference. The conference server 16 works in conjunction with the Conference button on the Internet telephone sets 20 to provide a call conferencing function. The conference server 16 comprises a functional module and is implemented as an add-on unit for the call server 14 or as a module in the call server 14.

In accordance with one aspect of the invention, the Internet telephone 20 includes an Instant Message (IM) function button denoted by reference 22. The Internet telephone 20 may also include other IM related functions keys, either as dedicated keys or context dependent softkeys. The Instant Message or IM button 22 works together with an instant message server 18 (shown individually as 18a and 18b in FIG. 1) to provide the functionality associated with instant voice messaging as described in more detail below. In one aspect, the instant message server 18 comprises a functional module implemented in software, and as such may be implemented with the call server 14. For example, the instant message server 18 and functionality may be integrated into the Call Pilot™ system from Nortel Networks Inc. In another aspect, the instant message server 18 is implemented as an add-on module.

The operation of an instant messaging function in accordance with the present invention is described with the following example with reference to FIG. 1 and User A and User B.

User A presses the IM key 22 on the IP telephone 20a. In response, the instant message server 18a issues a command prompting User A to enter the telephone number (e.g. directory number or DN) of User B. After entering the number, User A presses a Record key (not shown) on the set 20a, and then records a short message. The instant message server 18a may include code or software to restrict the instant message to a maximum length, for example, 30 seconds. Other editing functions may be provided with additional function keys (e.g. context dependent softkeys, not shown) on the set 20a and supporting software in the instant message server 18a. Once User A is satisfied with or has completed the recorded instant message, the IM key 22 (or a dedicated IM Send button) on the set 20a is pressed to send the message. The call processing of the instant message recorded by User A is handled by the instant message server 18a. The instant message server 18a sends the recorded instant message to the telephone set 20b for User B.

To transfer the recorded instant message to User. B, the instant message server 18b sends a command to the telephone set 18b for an audible notification, e.g. a short beep, and/or a visual notification, e.g. a flashing lamp. The short beep notifies User B that an instant voice message is waiting. User B presses the IM key 22 (or a dedicated Play button) to listen to the instant message sent by User A. This mode of operation is termed "Prompt Mode". The other mode of operation provided in accordance with the invention is termed "Auto Mode". If User B has their telephone set 18b in "Auto Mode", then once sent, the instant message server 18b automatically plays the instant message on the set 20b. If User B is not using the telephone 20b, then the instant message server 18b automatically plays the instant message over the telephone speaker (e.g. the handsfree speaker).

"Auto Mode" also supports operation in "Whisper Mode". Whisper mode occurs if a user, for example, User A, is already participating in call, but wishes to send an instant message to another user, for example, User B.

In Whisper mode, if User A is already on a call when the Instant Message (IM) key 22 is first pressed, the call server 14a mutes the existing call channel, and connects the input microphone on the telephone set 20a to the instant message server 18a. Once User A has recorded and sent the instant message, i.e. by pressing the IM key 22 (or a dedicated Send button), the call server 14a reconnects the microphone on the set 20a to the original call. This operation comprises "Whisper Send" mode.

The system 10 also operates in "Whisper Receive" mode for receiving the instant message if User B is already on a call when User A sends the instant message. If User B is on a call, the instant message server 18b conferences the instant message with the existing call so that only User B hears the instant message, for example, over the handset speaker if User B is using the handset, or the handsfree speaker with microphone muted, if User B is on the call using handsfree.

The operation of the instant messaging function is described in more detail at a system level with reference to FIG. 1 in terms of sending an instant message, transmitting the instant message, and receiving the instant message.

To Send an Instant Message, for example, from User A using telephone set 20a to User B using telephone set 20b, User A presses the IM button 22 on the Internet telephone set 20a. In response, the telephone set 20a sends a message to the device arbiter 17a indicating that the IM key 22 has been pressed by User A. The device arbiter 17a then passes the key pressed message to the instant message server 18a. In response, the instant message server 18a sends a message to the device arbiter 17a and a message to the telephone set 20a. The message to the device arbiter 17a instructs the arbiter 17a to direct key presses from the telephone set 20a to the instant message server 18a. The message to the telephone set 20a directs the set 20a to play a special dial tone. The special dial tone serves as a cue or notification for User A to dial the number of the person they wish to instant message. The digits entered by User A are then directed by the device arbiter 17a to the instant message server 18a. The instant message server 18a decodes the digits for the dialed number and determines: if the dialed number is a valid number; and if the dialed number is a subscriber to the instant message feature. These operations may involve the instant message server 18a querying or sending status requests to other instant message servers 18 in the network, and provide a locate function. The purpose of the locate function is to locate (i.e. find) the valid recipient before the message is recorded and sent. If the dialed number is valid for the instant message service, then the instant message server 18a sends the calling telephone set 20a a message directing the set 20a to generate a short "record" beep notification for the user. The message from the server 18a also instructs the set 20a to direct the output of the microphone to an IP (Internet Protocol) media stream 19a which is directed to the instant message server 18a (as shown in FIG. 1). If the user initiating the instant message call is already engaged in a telephone conversation, the microphone on the set 20a is temporarily disconnected from the existing conversation. User A then speaks or utters the message using the microphone and the message is recorded on the instant message server 18a. To send the instant message, User A presses an IM send key 24 on the set 20a. The IM 22 and IM send 24 keys may be implemented as dedicated keys on the set 20a or as context dependent softkeys. The telephone set 20 may include additional function keys or soft keys (not shown) for editing the instant message prior to sending. After receiving the instant message, the instant message server 18a sends a message to the telephone set 20a, if necessary, to reconnect the microphone to the original call.

To transmit the instant message received from the originating or calling telephone set 20a, the instant message server 18a looks for the recipient or destination set 20b, first on the local call server 14, and then by querying the other call servers 14 on the IP network 12. When the instant message server 18a finds the destination instant message server 18b, the instant message server 18a forwards the instant message to the destination instant message server 18b where it can be played on the telephone set 20b for the recipient.

At the destination instant message server 18b, the instant message can be received in two ways. In one way, the instant message is received without any user intervention and played directly on the destination telephone set 20b. In another way, the destination telephone set 20b notifies the recipient user of a pending instant message.

To receive the instant message automatically, or without user intervention, i.e. in "Auto" mode, the instant message server 18b first sends a message to the telephone set 20b to connect the speaker to the IP audio stream (for example, IP stream 19b illustrated in FIG. 1) if the recipient user is not on another active call. The instant message server 18b sends the IP audio stream to the telephone set 20b, and the instant message is played over the handsfree speaker for the user to hear. If the recipient, i.e. telephone 20b, is on another call, then the instant message server 18b sends a message to the call server 14 to set up a conference bridge (indicated by reference 21 in FIG. 1) such that only the recipient at telephone set 20b can hear all parties in the conference, i.e. the party on the original call and the instant voice message call. The other parties in conference only hear each other, and not the instant voice message. The instant message server 18b, then sends the IP audio stream to the conference bridge 21 so that User B at telephone set 20b hears the instant message in addition to the existing conversation.

To receive the instant message based on user intervention, i.e. in "Prompt" mode, the instant message server 18b sends a message to the recipient telephone set 20b directing the set 20b sound a short "beep" and/or flash a lamp beside the IM key 22 (or a dedicated "IM Receive" key). As described above, the IM key 22 (and/or the IM Receive key) may be implemented as a context dependent softkey or as a dedicated key (not shown). User B presses the IM key 22 and the telephone set 20b sends the IM Receive key pressed message to the instant server 18b. The instant server 18b then proceeds with the instant message as described above for automatic reception.

To reply to an instant message, the user, e.g. User B, can reply by. pressing the IM key 22 (or a dedicated "IM Reply" key which may be implemented as a context dependent softkey or a dedicated key). In response to the IM key 22 or the IM Reply key being pressed, the instant message server 18b proceeds with a send instant message and transmit instant message procedure as described above, starting after the record "beep" is heard.

The components/modules and functionality of the instant voice messaging according to the invention are implemented in software or a combination of software and hardware in an instant message server, locator module, device arbiter and/or call server as described above. The coding and implementation details will be system specific and within the understanding of those skilled in the art.

Figure 2:
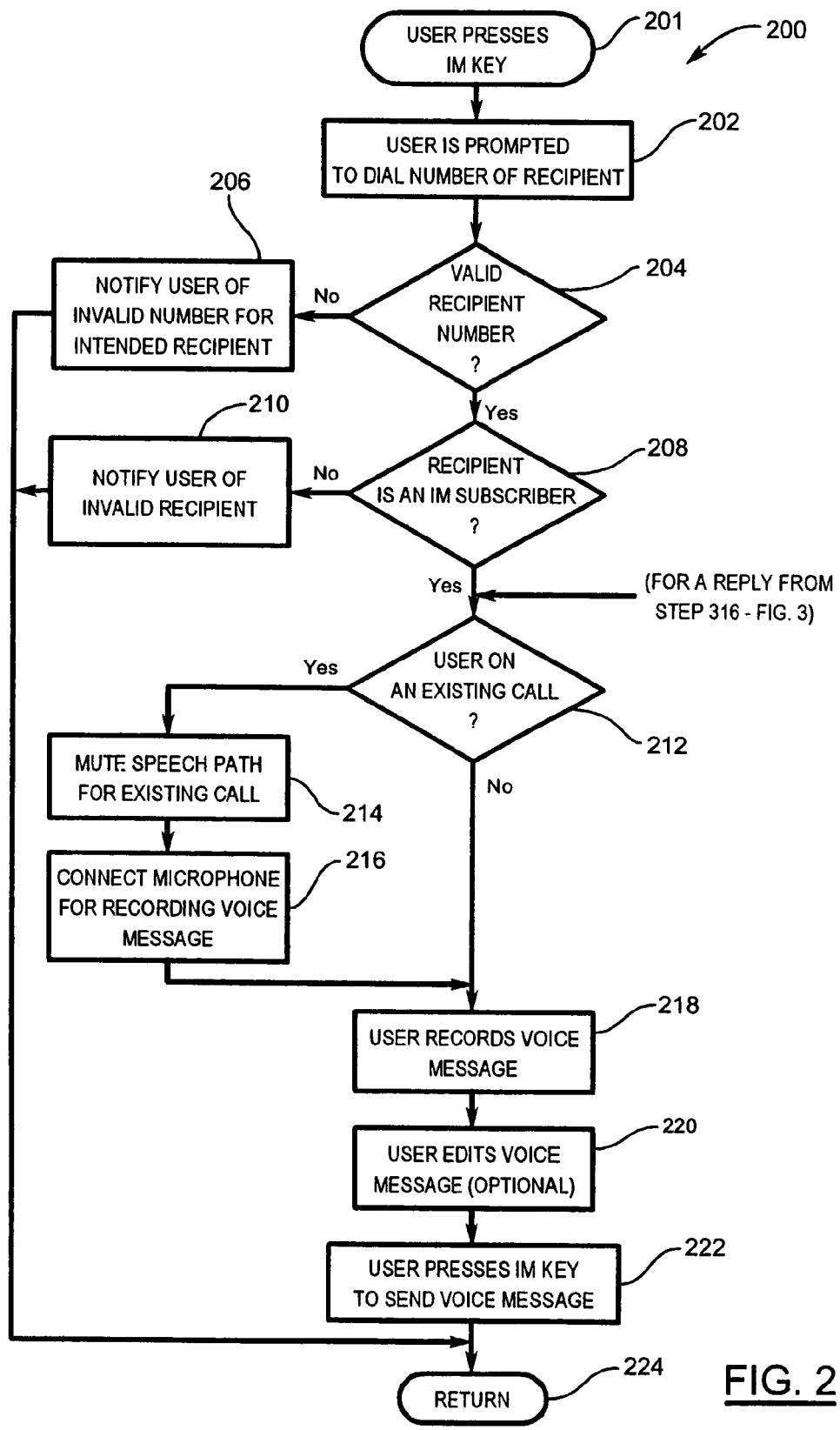
FIG. 2 shows in flowchart form a process for sending an instant voice message in accordance with the present invention.

Reference is next made to FIG. 2, which shows in flowchart form a process for sending an instant message according to an aspect of the invention. The process indicated generally by reference 200 begins with a user pressing the IM key on the telephone set (block 201). The user is prompted to dial the number of the intended recipient (block 202). Once the number has been dialed, a check is made to determine if the directory number (DN) is valid as indicated in decision block 204. If the number is not valid, then the user is notified (block 206) and the instant messaging procedure returns or ends (block 224). If the dialed number is a valid one, then another check is made to determine if the intended recipient is a subscriber (or equipped) to receive the instant voice message (decision block 208). If the intended recipient is not a subscriber, the user is notified (block 210), and the instant messaging procedure returns or ends (block 224). If the intended recipient is a subscriber (as determined in decision block 208), then a check is made in decision block 212 to determine if the user is on an existing call. If yes, then the speech path for the existing call is muted (block 214), and the microphone in the telephone set is connected to allow the user to proceed with recording the instant voice message (block 216). Next the user records the instant voice message by speaking into the microphone (block 218). If the telephone set includes a user interface (e.g. a display with dedicated keys or context dependent softkeys), then as an optional step the user can further edit the instant voice message (block 220). The user then presses the. IM key (block 222) to send the voice message to the intended recipient.

Figure 3:
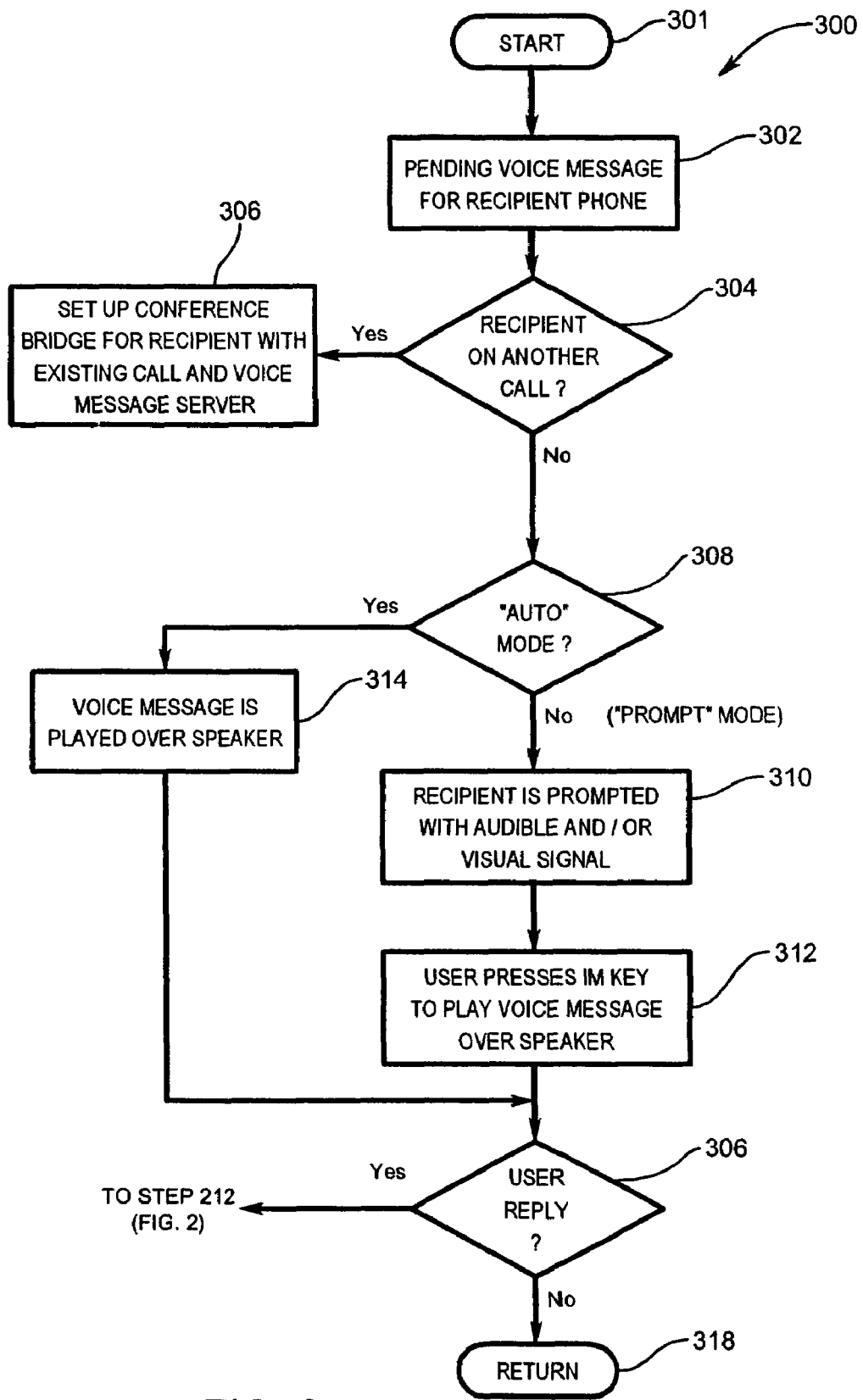
FIG. 3 shows in flowchart form a process for receiving an instant voice message in accordance with the present invention.

Reference is next made to FIG. 3, which shows in flowchart form a process for receiving an instant message according to an aspect of the invention. The process indicated generally by reference 300 begins with a pending instant voice message for the intended recipient (block 302). A check is made to determine if the intended recipient is on another call (decision block 304). If the intended recipient is on another call, then a conference bridge or call is set up for the call and for the instant voice message (block 306). Next a check is made in decision block 308 to determine if the telephone set for the intended recipient is operating in "Auto" mode or "Prompt" mode. If the recipient's set is operating in "Auto" mode, the instant voice message is automatically played at the recipient's telephone over the handsfree speaker or the handset speaker. If the recipient's set is operating in "Prompt" mode, the recipient's telephone set is notified with a short audible beep and/or a lamp flash. The recipient presses the IM key to play the instant voice message over the handsfree speaker or the handset speaker. If the recipient wishes to send an instant voice message in reply (decision block), then the recipient presses the IM key (block 202 FIG. 2), and the steps in the process 200 (FIG. 2) are followed as described above.

The present invention may be embodied in other specific forms without departing from the spirit or essential characteristics thereof. Other adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. At an instant message server, a method of managing initiation of recording on an instant voice message, said method comprising:

receiving, from a device arbiter, an indication of a button press indicative of a user desire to record said instant voice message;

responsive to said receiving, transmitting a first message to said device arbiter, said first message instructing said arbiter to direct key presses received from a first telephone set to said instant message server;

responsive to said receiving, transmitting a second message to said first telephone set, said second message directing said first telephone set to play a special dial tone, said special dial tone prompting a user of said first telephone set to input a directory number to which to direct said instant voice message;

receiving, from said device arbiter, said directory number input by said user;

determining that said directory number is valid; and responsive to said determining, transmitting a third message to said first telephone set, said third message instructing said first telephone set to indicate, to said user, that said directory number has been validated, thereby prompting recording of said instant voice message.

* * * * *